(12) United States Patent
Kaplan

(10) Patent No.: US 12,087,335 B2
(45) Date of Patent: Sep. 10, 2024

(54) IN-SITU INSTALL OF CROSS-FLUX MAGNET IN VOICE COIL MOTOR ACTUATOR

(71) Applicant: Western Digital Technologies, Inc., San Jose, CA (US)

(72) Inventor: Brandon Kaplan, Woodinville, WA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/224,398

(22) Filed: Jul. 20, 2023

(65) Prior Publication Data

US 2024/0212707 A1 Jun. 27, 2024

Related U.S. Application Data

(60) Provisional application No. 63/435,405, filed on Dec. 27, 2022.

(51) Int. Cl.
| | | |
|---|---|---|
| *G11B 5/02* | (2006.01) | |
| *G11B 5/48* | (2006.01) | |
| *G11B 5/55* | (2006.01) | |
| *G11B 21/02* | (2006.01) | |
| *H02K 15/00* | (2006.01) | |
| *H02K 41/035* | (2006.01) | |

(52) U.S. Cl.
CPC .......... *G11B 5/4806* (2013.01); *G11B 5/5573* (2013.01); *G11B 21/02* (2013.01); *H02K 15/00* (2013.01); *H02K 41/0354* (2013.01)

(58) Field of Classification Search
None
See application file for complete search history.

(56) References Cited

U.S. PATENT DOCUMENTS

| | | | |
|---|---|---|---|
| 5,041,935 A | 8/1991 | Aruga et al. | |
| 5,315,466 A | 5/1994 | Nishimoto et al. | |
| 5,486,965 A * | 1/1996 | Yoshida | G11B 21/083 360/99.18 |
| 5,636,091 A | 6/1997 | Asano | |
| 6,606,223 B2 | 8/2003 | Ooi et al. | |
| 7,327,537 B1 | 2/2008 | Oveyssi | |
| 7,457,084 B2 | 11/2008 | Matsuda et al. | |
| 7,540,004 B2 | 5/2009 | Lee et al. | |
| 8,064,171 B2 | 11/2011 | Shimizu et al. | |

(Continued)

FOREIGN PATENT DOCUMENTS

| | | |
|---|---|---|
| JP | 2004023969 A | 1/2004 |
| KR | 100714101 B1 | 5/2007 |

OTHER PUBLICATIONS

Choi, Young-Man et al., Halbach Magnetic Circuit for Voice Coil Motor in Hard Disk Drives, Journal of Magnetics 15 (3), 143-147 (2010), / Accepted Jul. 26, 2010, Journal of Magnetics.

*Primary Examiner* — William J Klimowicz
(74) *Attorney, Agent, or Firm* — John D. Henkhaus

(57) ABSTRACT

A process of assembling a voice coil motor (VCM), such as for a hard disk drive, includes creating an opening in a yoke, attaching a primary magnet to an inside surface of the yoke, installing through the opening in the yoke a cross-flux magnet into a channel of the primary magnet, and installing a plug into the opening in the yoke. Thus, part count is minimized and the manufacturing process is readily incorporated into existing VCM manufacturing processes.

10 Claims, 7 Drawing Sheets

(56) References Cited

U.S. PATENT DOCUMENTS

| | | | |
|---|---|---|---|
| 8,305,714 B2 | 11/2012 | Suzuki et al. | |
| 9,942,663 B1 | 4/2018 | Salvatti et al. | |
| 11,423,930 B2 * | 8/2022 | Gao | G11B 5/5573 |
| 2001/0048576 A1 | 12/2001 | Kazmierczak | |
| 2002/0054458 A1 | 5/2002 | Subrahmanyan | |
| 2003/0099067 A1 | 5/2003 | Farahat | |
| 2003/0127317 A1 | 7/2003 | Cope et al. | |
| 2005/0264108 A1 * | 12/2005 | Devaney | H02K 41/0358 |
| | | | 310/12.25 |
| 2007/0086117 A1 | 4/2007 | Lee | |
| 2007/0145831 A1 * | 6/2007 | Antonius Theodorus Dams | G03F 7/70758 |
| | | | 310/12.25 |
| 2009/0015968 A1 | 1/2009 | Xu et al. | |
| 2010/0302686 A1 | 12/2010 | McGrath | |
| 2012/0120529 A1 | 5/2012 | Ozaki et al. | |
| 2013/0163114 A1 * | 6/2013 | Jeon | H01F 7/066 |
| | | | 360/75 |
| 2019/0217335 A1 * | 7/2019 | Nikseresht Ghanepour | B44F 1/08 |
| 2019/0273405 A1 * | 9/2019 | Ho | H02K 1/2783 |
| 2020/0177036 A1 * | 6/2020 | Yokoyama | H02K 1/274 |
| 2020/0282463 A1 * | 9/2020 | Fujikawa | H01F 7/0205 |
| 2021/0381314 A1 * | 12/2021 | Peters | E21B 7/067 |
| 2021/0384786 A1 * | 12/2021 | Tamura | H02K 3/47 |
| 2022/0139420 A1 * | 5/2022 | Gao | H02K 1/02 |
| | | | 360/234.3 |
| 2022/0139603 A1 * | 5/2022 | Gao | G11B 5/5573 |
| | | | 335/306 |
| 2023/0216360 A1 * | 7/2023 | Sakuragi | H02K 1/2766 |
| | | | 310/268 |

* cited by examiner

TOP VIEW

BOTTOM VIEW

IN-SITU INSTALL OF CROSS-FLUX MAGNET IN VOICE COIL MOTOR ACTUATOR

FIELD OF EMBODIMENTS

Embodiments of the invention relate generally to voice coil motors, and particularly to a hard disk drive rotary voice coil actuator having a cross-flux magnet installed through the primary magnet housing.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Typically a voice coil motor ("VCM") is the type of actuator employed in HDDs to move the read-write head for accessing portions of a corresponding magnetic-recording disk for read and write operations. VCMs rely on permanent magnets for their own persistent magnetic fields. Such a field is typically strongest at the magnet surface and decreases with distance therefrom and, therefore, the magnetic flux density likewise decreases with distance from the magnet. Additionally, the cost of a permanent magnet is typically relative to the corresponding grade of the magnet and the material from which the magnet is made, with higher grades indicating stronger magnets. Increasing areal density (a measure of the quantity of information bits that can be stored on a given area of disk surface) is one of the on-going goals of hard disk drive technology evolution. In view of the trend toward higher areal density in HDDs, performance improvements to the VCM may be desirable.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a modified voice coil motor (VCM) assembly having a cross-flux magnet, such as for use in a hard disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that performance improvements to the VCM may be desirable. The torque generated in a VCM is proportional to the magnetic flux density produced by a corresponding permanent magnet, in that as the flux density increases the motor efficiency increases. Thus, the higher the magnetic field gradient produced by the permanent magnet then the more efficient the VCM is likely to perform. However, because HDDs are quite space-limited, the approaches available for building a better VCM are likewise limited.

Opening-Installed Halbach-Style Voice Coil Motor

Figure 2:
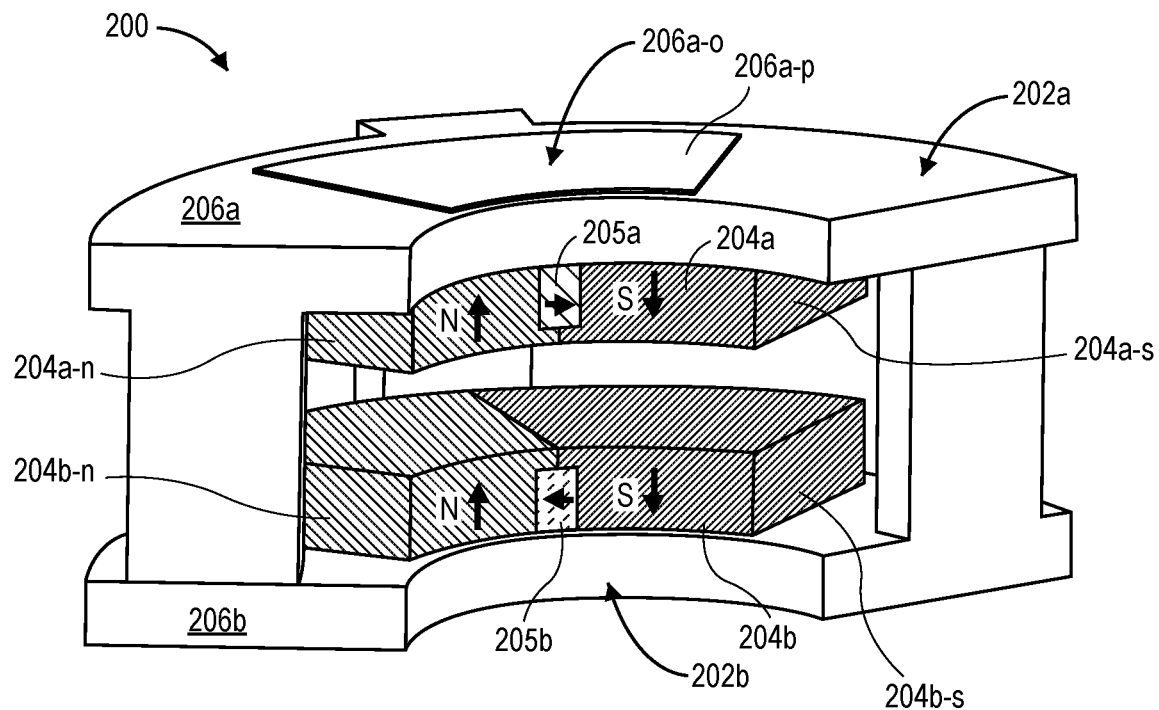
FIG. 2 is a perspective view illustrating a modified voice coil motor (VCM) assembly having a cross-flux magnet, according to an embodiment.

FIG. 2 is a perspective view illustrating a modified voice coil motor (VCM) assembly having a cross-flux magnet according to an embodiment. VCM assembly 200 ("VCM 200") comprises a first magnet assembly 202a and a second magnet assembly 202b coupled together. For example, the first and second primary magnet assemblies 202a, 202b may be bonded together or may be manufactured as an integrated assembly.

First magnet assembly 202a comprises a first primary permanent magnet 204a magnetized to have a magnetic north pole 204a-n (N) and an adjacent magnetic south pole 204a-s (S) on respective sides of a first boundary, and is bonded to a corresponding first yoke 206a. First yoke 206a comprises an opening 206a-o therethrough, which is filled with a first plug 206a-p. According to an embodiment, the first yoke 206a and the first plug 206a-p are composed of the same material, such as a stainless steel for example. Notably, first magnet assembly 202a further comprises a first cross-flux magnet 205a embedded within and bonded to the first primary magnet 204a through the opening 206a-o in the first yoke 206a. According to embodiments, the first cross-flux magnet 205a is embedded within a pre-formed channel or groove (see, e.g., FIGS. 4B-4C) in the first primary magnet 204a, extending from a proximal side (yoke 206a side) or surface toward but not to a distal side (air gap side) or surface of the first primary magnet 204a and extending from a front side or surface to a back side or surface of the first primary magnet 204a. The first cross-flux magnet 205a is magnetized in a direction substantially normal (i.e., perpendicular) to the direction of the N/S poles 204a-n, 204a-s (here, e.g., in a direction from N to S), thus forming what is referred to as a Halbach array. Generally, a Halbach array is a special arrangement of permanent magnets that augments or the magnetic field (e.g., reinforces the flux) on one side of the array while cancelling the field (e.g., cancels the flux) to near zero on the other side, by having a spatially rotating pattern of magnetization.

Here, this Halbach array effect is enabled by the embedded and appropriately magnetized first cross-flux magnet 205a embedded within and between (i.e., substantially at the first boundary between) the N/S poles 204a-n, 204a-s. This arrangement and in-situ assembly technique enabled through use of the opening 206a-o through the first yoke 206a, through which the first cross-flux magnet 205a is inserted into the first primary magnet 204a and which is filled with the first plug 206a-p, produces a modification of the classic Halbach array requiring fewer total components (as compared to a composite magnet or other form of Halbach array assembly manufactured outside of the first magnet assembly 202a) and significantly reduced manufacturing complications at the cost of a small amount of optimality.

Similarly, second magnet assembly 202b comprises a second primary permanent magnet 204b magnetized to have a magnetic north pole 204b-n (N) and an adjacent magnetic south pole 204b-s (S) on respective sides of a second boundary, and is bonded to a corresponding second yoke 206b. Second yoke 206b comprises an opening 206b-o therethrough (not visible here; see, e.g., FIG. 4A), which is filled with a second plug 206b-p (not visible here; see, e.g., FIGS. 3D, 4F). According to an embodiment, the second yoke 206b and the second plug 206b-p are composed of the same material, such as a stainless steel for example. Here too second magnet assembly 202b further comprises a second cross-flux magnet 205b embedded within and bonded to the second primary magnet 204b through the opening 206b-o in the second yoke 206b. According to embodiments, the second cross-flux magnet 205b is embedded within a pre-formed channel or groove (see, e.g., channel 204b-c of FIGS. 4B-4C) in the second primary magnet 204b, extending from a proximal side (yoke 206b side) or surface toward but not to a distal side (air gap side) or surface of the second primary magnet 204b and extending from a front side or surface to a back side or surface of the second primary magnet 204b. The second cross-flux magnet 205b is magnetized in a direction substantially normal to the direction of the N/S poles 204b-n, 204b-s (here, e.g., in a direction from S to N), thus forming a Halbach array. Here too this Halbach array effect is enabled by the embedded and appropriately magnetized second cross-flux magnet 205b embedded within and between (i.e., substantially at the first boundary between) the N/S poles 204b-n, 204b-s, and requires fewer total components and reduced manufacturing complications.

Note that while the first and second primary magnets 204a, 204b are depicted here and throughout with portions (i.e., N/S poles 204a-n, 204a-s and N/S poles 204b-n, 204b-s) magnetized in particular directions for purposes of example, the direction in which each pole 204a-n, 204a-s, 204b-n, 204b-s is magnetized may vary from implementation to implementation. For example, the poles depicted as poles 204a-n and 204b-n may in practice be magnetized in the S direction while the poles depicted as poles 204a-s and 204b-s may in practice be magnetized in the N direction. Similarly, while the first and second cross-flux magnets 205a, 205b are depicted magnetized in particular directions for purposes of example, the direction in which each cross-flux magnet 205a, 205b is magnetized may vary from implementation to implementation and, therefore, each may be magnetized in a direction opposing the directions depicted here, as long as each is magnetized in a direction substantially normal to the direction of the N/S poles 204a-n, 204a-s, 204b-n, 204b-s. Furthermore, a complete VCM assembly may be implemented having only one half-assembly (e.g., magnet assembly 202a or 202b) configured in a Halbach array arrangement with a corresponding embedded cross-flux magnet (e.g., cross-flux magnet 205a or 205b), while the opposing cooperative VCM half-assembly is configured conventionally, i.e., without the Halbach array arrangement having an embedded cross-flux magnet.

Figure 3A:
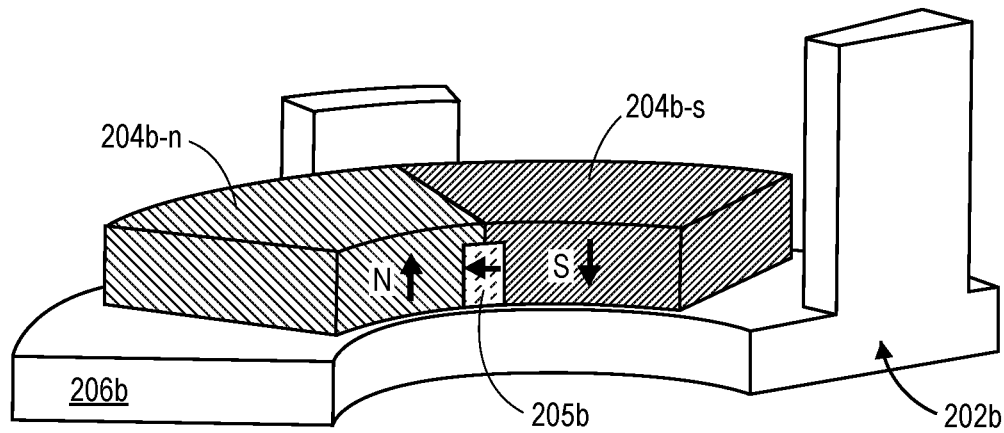
FIG. 3A is a perspective view illustrating a half-assembly of the modified VCM assembly of FIG. 2, according to an embodiment.
Figure 3B:
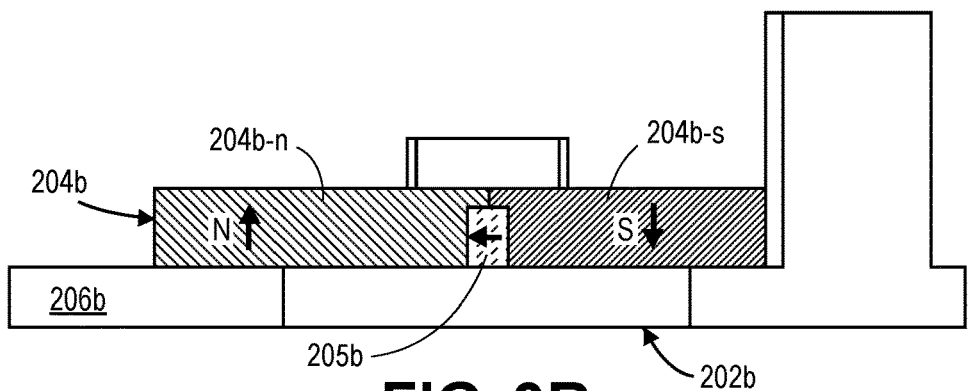
FIG. 3B is a front view of the half-assembly of the modified VCM assembly of FIG. 3A, according to an embodiment.
Figure 3C:
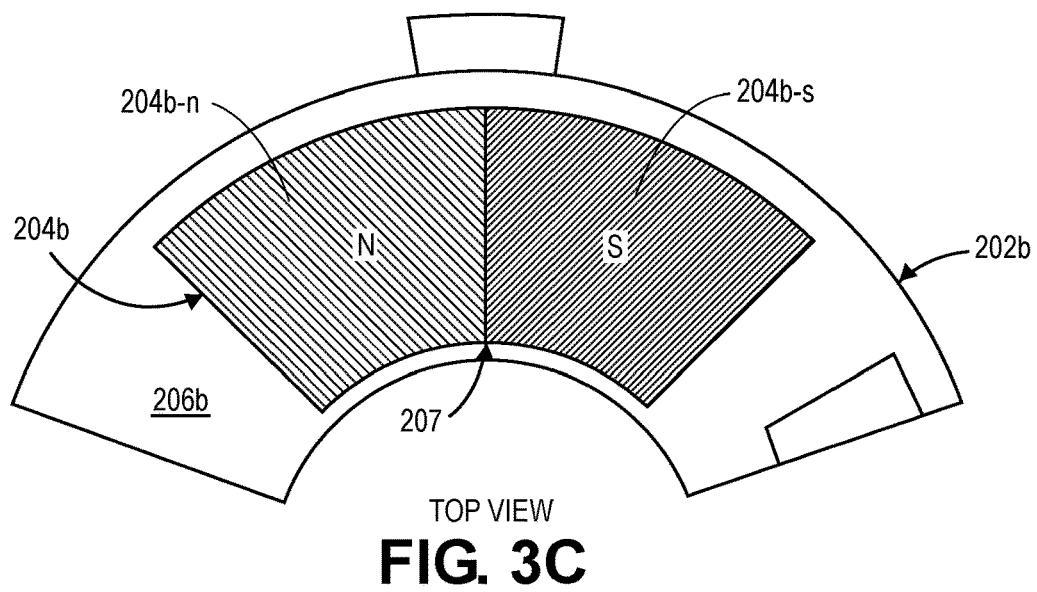
FIG. 3C is a top view of the half-assembly of the modified VCM assembly of FIG. 3A, according to an embodiment.
Figure 3D:
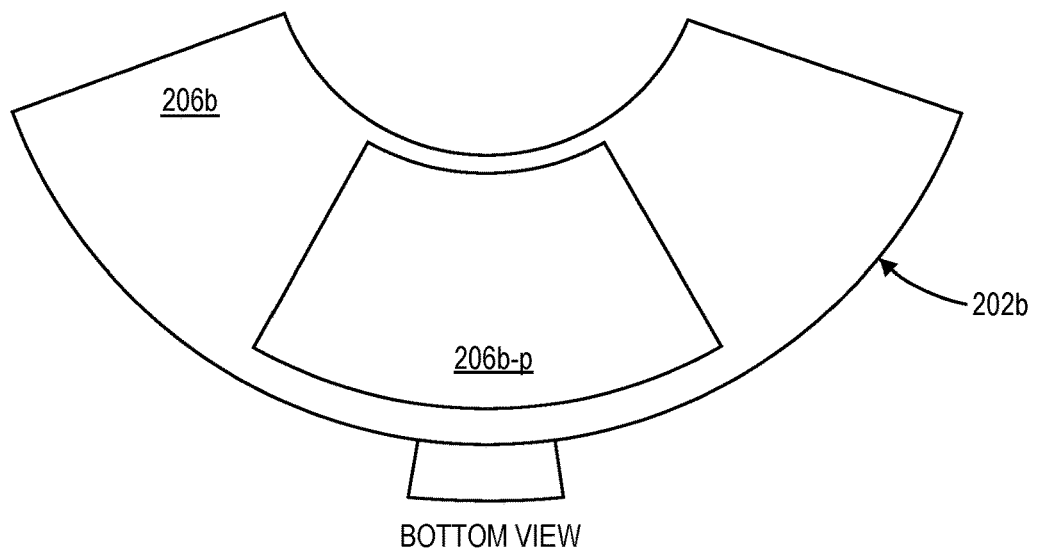
FIG. 3D is a bottom view of the half-assembly of the modified VCM assembly of FIG. 3A, according to an embodiment.

FIG. 3A is a perspective view illustrating a half-assembly of the modified VCM assembly of FIG. 2, FIG. 3B is a front view of the half-assembly of the modified VCM assembly of FIG. 3A, FIG. 3C is a top view of the half-assembly of the modified VCM assembly of FIG. 3A, and FIG. 3D is a bottom view of the half-assembly of the modified VCM assembly of FIG. 3A, all according to an embodiment. As noted, FIGS. 3A-3D are further views of a half-assembly of the modified VCM assembly of FIG. 2 to further illustrate details of second magnet assembly 202b. According to an embodiment, multiple half-assemblies may be manufactured in this same form and then coupled with another such half-assembly to form a VCM magnet assembly such as VCM assembly 200 (FIG. 2).

Collectively, FIGS. 3A-3D illustrate the second magnet assembly 202b which comprises second primary permanent magnet 204b magnetized to have a magnetic north pole 204b-n (N) and an adjacent magnetic south pole 204b-s (S) on respective sides of a boundary 207, and is adhered or otherwise bonded to corresponding second yoke 206b. Second yoke 206b comprises the opening 206b-o therethrough (not visible here; see, e.g., FIG. 4A) which is filled with second plug 206b-p (FIG. 3D). Shown also is the second cross-flux magnet 205b (FIGS. 3A-3B) embedded within and bonded to the second primary magnet 204b. The second cross-flux magnet 205b is magnetized in a direction substantially normal to the direction of the N/S poles 204b-n, 204b-s (here, e.g., in a direction from S to N), thus forming a Halbach array. As is common with a rotational VCM, the yoke 206b and the primary permanent magnet 204b are configured annularly, with the different N/S poles of the primary permanent magnet 204b positioned in a circumferential direction relative to each other and poled in directions substantially normal to the primary surface of the primary permanent magnet 204b.

Method of Assembling a VCM Assembly Having a Cross-Flux Magnet

Figure 4A:
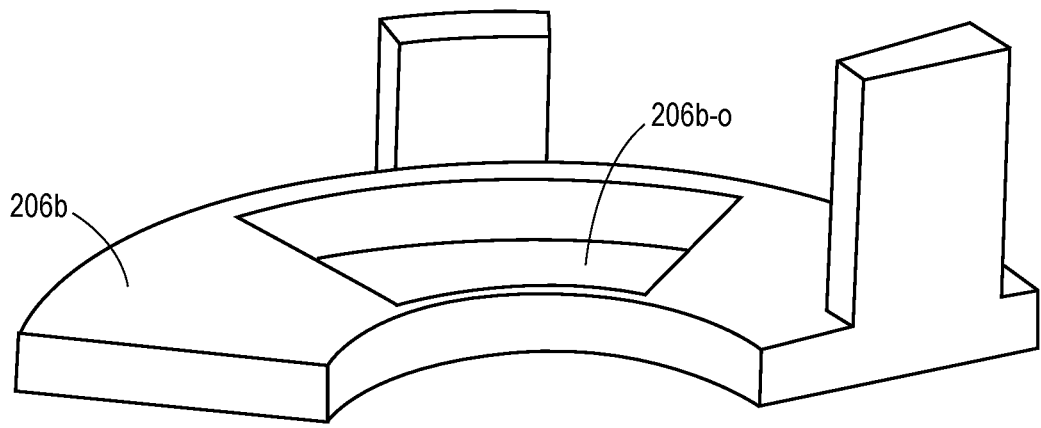
FIG. 4A is a perspective view illustrating a first stage of an assembly process for the half-assembly of the modified VCM assembly of FIG. 3A, according to an embodiment.
Figure 4B:
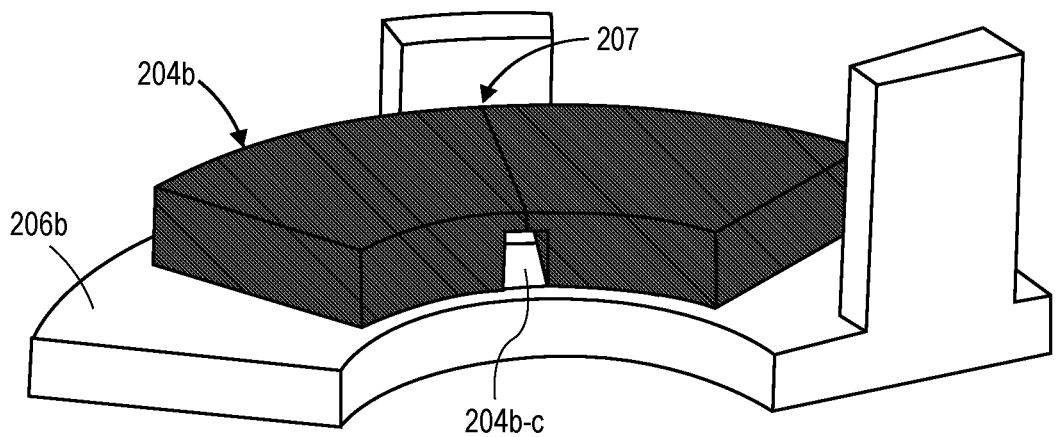
FIG. 4B is a perspective view illustrating a second stage of the assembly process for the half-assembly of the modified VCM assembly of FIG. 3A, according to an embodiment.
Figure 4C:
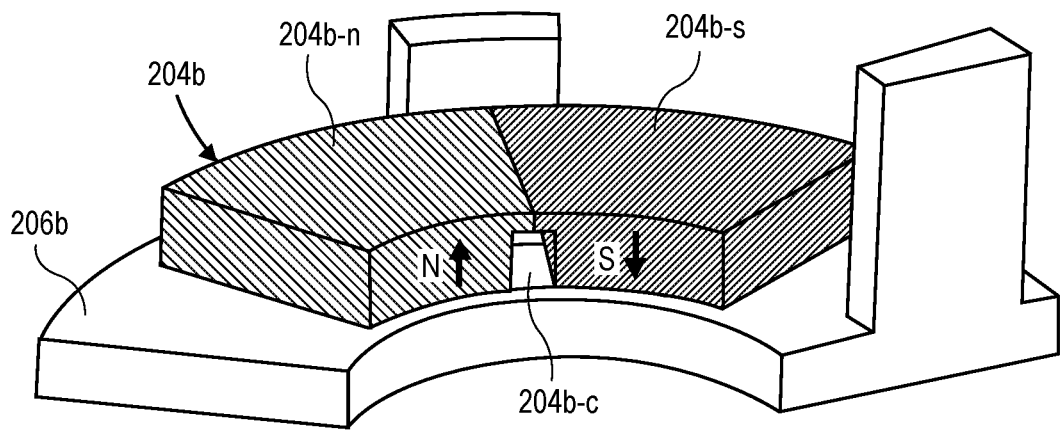
FIG. 4C is a perspective view illustrating a third stage of the assembly process for the half-assembly of the modified VCM assembly of FIG. 3A, according to an embodiment.
Figure 4D:
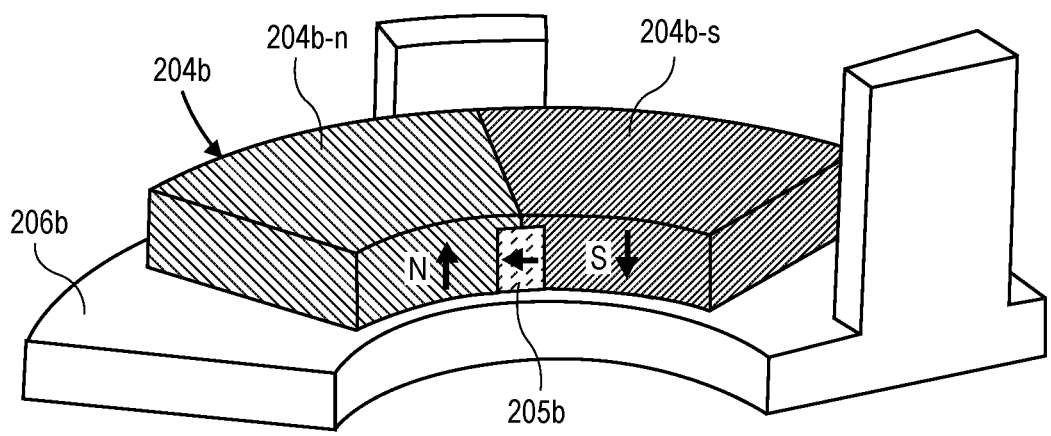
FIG. 4D is a perspective view illustrating a fourth stage of the assembly process for the half-assembly of the modified VCM assembly of FIG. 3A, according to an embodiment.
Figure 4E:
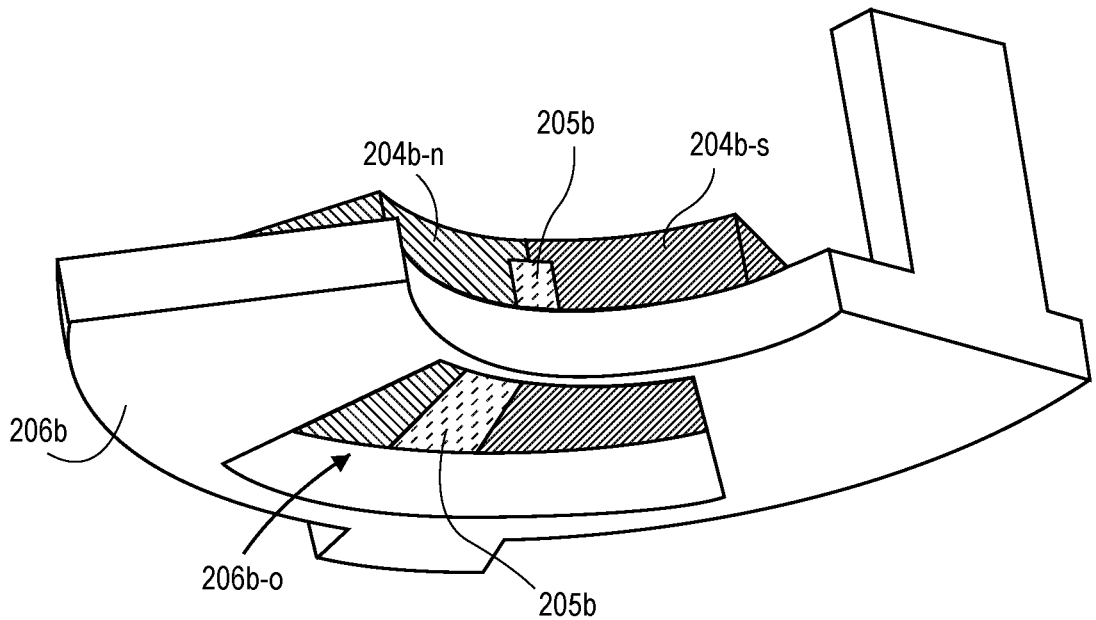
FIG. 4E is a bottom perspective view illustrating the fourth stage of the assembly process for the half-assembly of the modified VCM assembly of FIG. 3A, according to an embodiment.
Figure 4F:
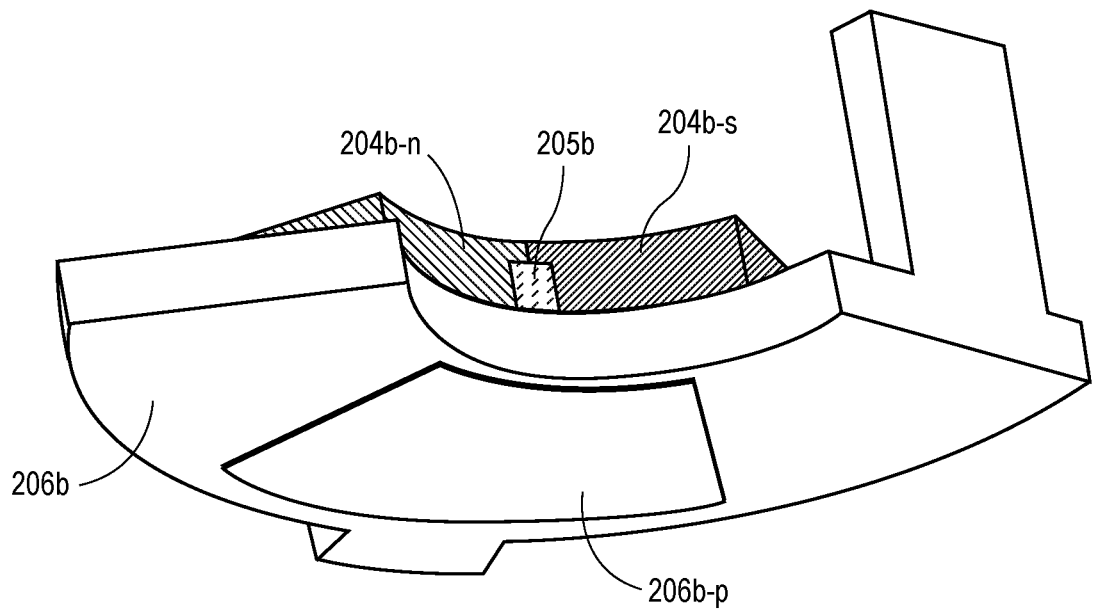
FIG. 4F is a perspective view illustrating a fifth stage of the assembly process for the half-assembly of the modified VCM assembly of FIG. 3A, according to an embodiment.

FIGS. 4A-4F are each a perspective view illustrating a stage of an assembly process for the half-assembly of the modified VCM assembly of FIG. 3A, according to an embodiment. Particularly, FIG. 4A is a perspective view illustrating a first stage of an assembly process for the half-assembly of the modified VCM assembly of FIG. 3A; FIG. 4B is a perspective view illustrating a second stage of the assembly process for the half-assembly of the modified VCM assembly of FIG. 3A; FIG. 4C is a perspective view illustrating a third stage of the assembly process for the half-assembly of the modified VCM assembly of FIG. 3A; FIG. 4D is a perspective view illustrating a fourth stage of the assembly process for the half-assembly of the modified VCM assembly of FIG. 3A; FIG. 4E is a bottom perspective view illustrating the fourth stage of the assembly process for the half-assembly of the modified VCM assembly of FIG. 3A; and FIG. 4F is a perspective view illustrating a fifth stage of the assembly process for the half-assembly of the modified VCM assembly of FIG. 3A, all according to an embodiment.

Figure 5:
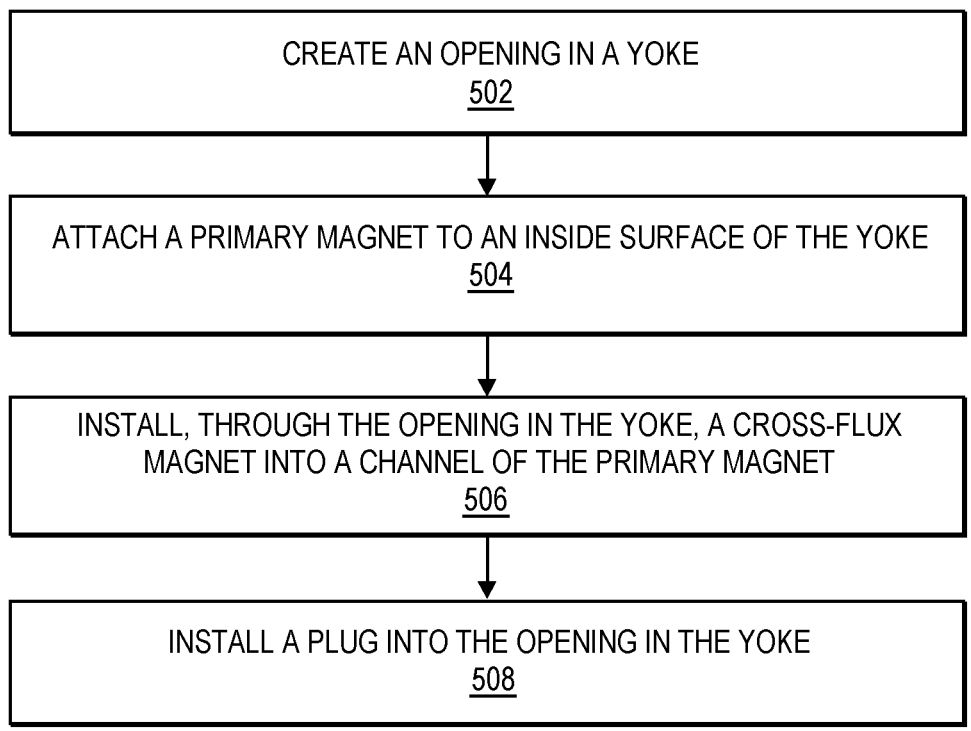
FIG. 5 is a flow diagram illustrating a method of assembling a VCM assembly having a cross-flux magnet, according to an embodiment.

FIG. 5 is a flow diagram illustrating a method of assembling a VCM assembly having a cross-flux magnet, according to an embodiment. The method of FIG. 5 is described with reference to the assembly stages of FIGS. 4A-4F, for an opening-installed half-assembly of a VCM assembly having a cross-flux magnet, such as the half-assembly of modified VCM assembly of FIG. 3A.

The first stage of FIG. 4A depicts the yoke 206b, such as a stamped plate, having the opening 206b-o therethrough. The second stage of FIG. 4B depicts uncharged primary magnet 204b bonded, adhered, attached or otherwise coupled to the yoke 206b, with the primary magnet 204b having a groove or channel 204b-c ground or otherwise formed therein, at the boundary 207. The third stage of FIG. 4C depicts the primary magnet 204b coupled to the yoke 206b, with the magnet 204b now being magnetized, charged, poled, or otherwise configured with the N/S poles 204b-n, 204b-s. Consistent with current typical manufacturing process, the primary magnet 204b is magnetized after being bonded to the yoke 206b, thus incorporating this stage of the process into existing manufacturing processes.

The fourth stage of FIG. 4D depicts the primary magnet 204b coupled to the yoke 206b, with the cross-flux magnet 205b now installed, embedded within the primary magnet 204b. According to an embodiment, cross-flux magnet 205b is pre-charged or pre-magnetized prior to installation in primary magnet 204b. Notably, the cross-flux magnet 205b is embedded within the channel 204b-c (FIGS. 4B-4C) and bonded to the primary magnet 204b through the opening 206b-o (FIG. 4A) in the yoke 206b. According to an embodiment, cross-flux magnet 205b is embedded within the pre-formed channel 204b-c such that cross-flux magnet 205b extends from a proximal side (yoke 206b side) or surface (e.g., in-plane with the primary magnet 204b on the proximal side, so as to be more like a traditional Halbach array) toward but not to a distal side (air gap side) or surface of the primary magnet 204b and from a front side or surface to a back side or surface of the primary magnet 204b (see, e.g., FIG. 4E). The portion of primary magnet 204b between the cross-flux magnet 205b and the top surface of primary magnet 204b provides for a single part primary magnet 204b, thereby limiting part count and simplifying manufacturing. As described elsewhere herein, the second cross-flux magnet 205b is magnetized in a direction substantially perpendicular to the direction of the N/S poles 204b-n, 204b-s (here, e.g., in a direction from S to N), thus effectively forming a Halbach array. Note that while the cross-flux magnet 205b and the channel 204b-c in which cross-flux magnet 205b is embedded are each depicted here and throughout as generally rectangular in shape for purposes of example, the shape in which the cross-flux magnet 205b and the corresponding channel 204b-c are formed may vary from implementation to implementation. For a non-limiting example, the cross-flux magnet 205b and the corresponding channel 204b-c may be formed in a more trapezoidal shape, whereby the sidewalls of each are tapered/chamfered (e.g., wider at the proximal side and narrower at the distal side) for ease of installation.

FIG. 4E illustrates a bottom perspective view of the fourth stage of FIG. 4D, again depicting the primary magnet 204b coupled to the yoke 206b with the cross-flux magnet 205b installed therein. FIG. 4E further illustrates the opening 206b-o in the yoke 206b, through which the cross-flux magnet 205b is installed into and between the N/S poles 204b-n, 204b-s of primary magnet 204b. Finally, the fifth stage of FIG. 4F depicts the configuration of FIGS. 4D-4E, additionally with the plug 206b-p installed into the opening 206b-o (FIG. 4E), where the use of plug 206b-p provides for the desired largely uninterrupted flux path of yoke 206b.

With reference now to FIG. 5, at block 502 create an opening in a yoke. For example, machine or use other common manufacturing technique to form opening 206b-o in a source yoke 206b (see, e.g., FIG. 4A).

At block 504 attach a primary magnet to an inside surface of the yoke. For example, attach primary magnet 204b to the inner surface of yoke 206b (see, e.g., FIG. 4B). According to an embodiment, prior to attaching the primary magnet 204b, form the channel 204b-c (FIGS. 4B-4C) having a shape consistent with cross-flux magnet 205b, in the primary magnet 204b. However, channel 204b-c may alternatively be formed in-situ after the primary magnet 204b is bonded to yoke 206b.

At block 506 install, through the opening in the yoke, a cross-flux magnet into a channel of the primary magnet. For example, through the opening 206b-o in the yoke 206b, i.e., "in-situ", install a cross-flux magnet 205b (FIGS. 4D-4F) into a channel 204b-c (FIGS. 4B-4C) of the primary magnet 204b. According to an embodiment, after attaching the primary magnet (block 504) and prior to installing the cross-flux magnet (block 506), charge the primary magnet 204b to set opposing magnetization directions on respective sides or portions of the primary magnet, i.e., N/S poles 204b-n, 204b-s, such as delineated at boundary 207 (FIG. 4B) between the poles 204b-n, 204b-s. According to an embodiment, prior to installing into the primary magnet 204b, charge the cross-flux magnet 205b to set a magnetization direction substantially normal to the magnetization directions of the primary magnet 204b.

At block 508 install a plug into the opening in the yoke. For example, install a stainless steel plug 206b-p (FIG. 4F) into the opening 206b-o in a stainless steel yoke 206b. A different iron alloy material besides stainless steel may be implemented, however, use of the same material for the plug 206b-p and the yoke 206b is preferable.

A classic Halbach array requires a minimum of three magnetic components, each pre-magnetized, to be assembled together and bonded while exerting force on each other. This presents a challenging process considering the size and strength of the magnets used in HDD VCMs. In general, the approaches described herein improve over conventional HDD VCMs primarily in the strength of the VCM magnetic field versus the total amount of magnetic material required. Furthermore, fewer total parts are used and the manufacturing process is readily incorporated into existing VCM manufacturing processes, where such ease of manufacturing may lead to greater cost advantages over existing implementations of Halbach arrays for HDD VCMs.

Physical Description of Illustrative Operating Context(s)

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
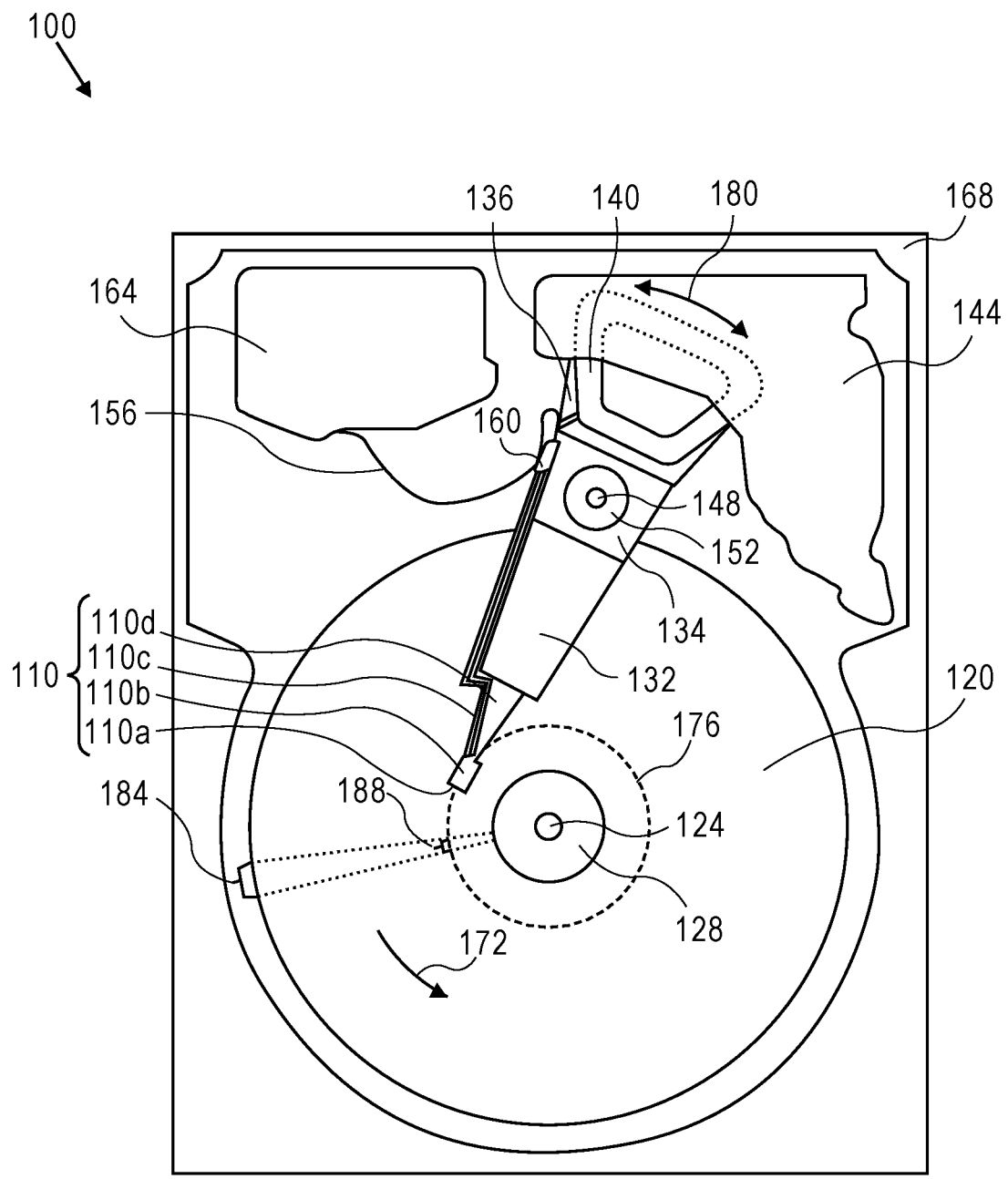
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or "motor base assembly" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A voice coil motor produced according to a method of comprising:
    creating an opening in a yoke;
    attaching a primary magnet to an inside surface of the yoke;
    installing, through the opening in the yoke, a cross-flux magnet into a channel of the primary magnet to form a cross-flux magnet assembly;
    installing a plug into the opening in the yoke;
    creating an opening in a second yoke;
    attaching a second primary magnet to an inside surface of the second yoke;
    charging the second primary magnet to set opposing magnetization directions on respective sides of a magnetic boundary;
    installing, through the opening in the second yoke, a pre-charged cross-flux magnet into a channel of the second primary magnet to form a second cross-flux magnet assembly;
    installing a plug into the opening in the second yoke; and
    coupling the yoke and cross-flux magnet assembly to the second yoke and second cross-flux magnet assembly.

2. A voice coil motor (VCM) comprising:
    a first yoke comprising an opening therethrough which is filled with a first plug;
    a first primary magnet bonded to the first yoke and having a proximal side adjacent to the first yoke and having an opposing distal side, the first primary magnet configured with opposing magnetic poles having opposing magnetization directions on respective sides of a first boundary;
    a first cross-flux magnet embedded within and bonded to the first primary magnet through the opening in the first yoke and having a proximal side adjacent to the first yoke, the first cross-flux magnet configured with a magnetization direction substantially normal to the magnetization directions of the first primary magnet;
    a second yoke comprising an opening therethrough which is filled with a second plug;
    a second primary magnet bonded to the second yoke and having a proximal side adjacent to the second yoke and having an opposing distal side, the second primary magnet configured with opposing magnetic poles having opposing magnetization directions on respective sides of a second boundary; and
    a second cross-flux magnet embedded within and bonded to the second primary magnet through the opening in the second yoke and having a proximal side adjacent to the second yoke, the second cross-flux magnet configured with a magnetization direction substantially normal to the magnetization directions of the second primary magnet.

3. The VCM of claim 2, wherein the first cross-flux magnet is embedded substantially at the first boundary and the second cross-flux magnet is embedded substantially at the second boundary.

4. The VCM of claim 2, further comprising:
a first channel extending from the proximal side toward but not to the distal side of the first primary magnet and in which the first cross-flux magnet is embedded; and
a second channel extending from the proximal side toward but not to the distal side of the second primary magnet and in which the second cross-flux magnet is embedded.

5. The VCM of claim 4, wherein the first channel extends from a front side to a back side of the first primary magnet and the second channel extends from a front side to a back side of the second primary magnet.

6. The VCM of claim 2, wherein the first yoke and the first plug are composed of the same material.

7. A hard disk drive (HDD) comprising:
a plurality of disk media rotatably mounted on a spindle motor;
a plurality of head sliders each housing a read-write transducer configured to read from and to write to a respective disk medium of the plurality of disk media; and
a voice coil motor (VCM) assembly configured for moving the plurality of head sliders to access portions of the plurality of disk media;
wherein the VCM assembly comprises:
a first yoke comprising an opening therethrough which is filled with a first plug composed of a same material as the first yoke,
a first primary magnet bonded to the first yoke and having a proximal side adjacent to the first yoke and having an opposing distal side, the first primary magnet configured with opposing magnetic poles having opposing magnetization directions on respective sides of a first boundary,
a first cross-flux magnet embedded within and bonded to the first primary magnet through the opening in the first yoke and having a proximal side adjacent to the first yoke, the first cross-flux magnet configured with a magnetization direction substantially normal to the magnetization directions of the first primary magnet,
a second yoke comprising an opening therethrough which is filled with a second plug composed of a same material as the second yoke,
a second primary magnet bonded to the second yoke and having a proximal side adjacent to the second yoke and having an opposing distal side, the second primary magnet configured with opposing magnetic poles having opposing magnetization directions on respective sides of a second boundary, and
a second cross-flux magnet embedded within and bonded to the second primary magnet through the opening in the second yoke and having a proximal side adjacent to the second yoke, the second cross-flux magnet configured with a magnetization direction substantially normal to the magnetization directions of the second primary magnet.

8. The HDD of claim 7, wherein the magnetization direction of the first cross-flux magnet is opposing the magnetization direction of the second cross-flux magnet.

9. The HDD of claim 7, wherein the first cross-flux magnet is embedded substantially at the first boundary and the second cross-flux magnet is embedded substantially at the second boundary.

10. The HDD of claim 7, further comprising:
a first channel extending from the proximal side toward but not to the distal side of the first primary magnet and in which the first cross-flux magnet is embedded; and
a second channel extending from the proximal side toward but not to the distal side of the second primary magnet and in which the second cross-flux magnet is embedded.

* * * * *